June 30, 1931.                J. H. HUNT                 1,812,005
                SECURING MEANS FOR DEMOUNTABLE WHEELS
                       Filed Sept. 15, 1926

INVENTOR:
J. Harold Hunt,
BY
ATTORNEY

Patented June 30, 1931

1,812,005

UNITED STATES PATENT OFFICE

J. HAROLD HUNT, OF DETROIT, MICHIGAN, ASSIGNOR TO BUDD WHEEL COMPANY, OF PHILADELPHIA, PENNSYLVANIA, A CORPORATION OF PENNSYLVANIA

SECURING MEANS FOR DEMOUNTABLE WHEELS

Application filed September 15, 1926. Serial No. 135,506.

This invention relates to fastening devices and while capable of general use, it has particular reference to a fastening means for dual wheels and constitutes an improvement over that shown in the application of Emil A. Nelson, Serial No. 691,115, filed February 7, 1924, and entitled "Demountable disc wheels" which has now matured into Patent No. 1,721,313.

The primary object of the present invention is to provide an improved fastening arrangement for a dual wheel wherein the wheels shall be securely fastened to each hub stub by a pair of nuts threaded directly thereon.

Another object is to provide a fastening arrangement which shall employ as one of the fastening elements, the standard nut commonly used for detachably securing a single wheel to the hub and thus greatly simplifying the construction.

A further object is to provide a fastening arrangement of the aforesaid character which shall firmly secure each wheel to the hub and retain the same under all conditions encountered on the road.

These and other objects will become more apparent as the description proceeds and will be pointed out in the appended claims.

In the drawings accompanying and forming part of this application:

Figure 1:
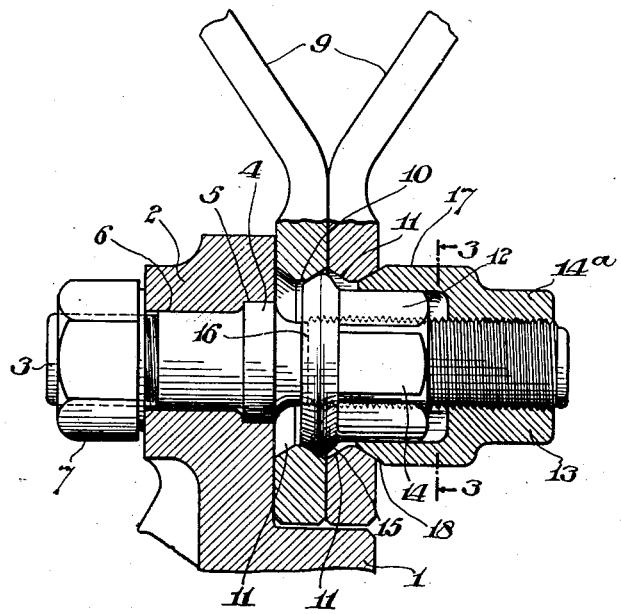
Figure 1 is a fragmentary sectional view of a dual disc wheel employing my improved fastening means.
Figure 3:
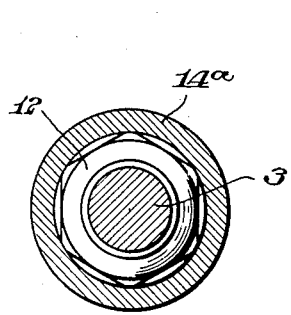
Fig. 3 is a sectional view taken on the line 3—3 of Fig. 2.
Figure 2:
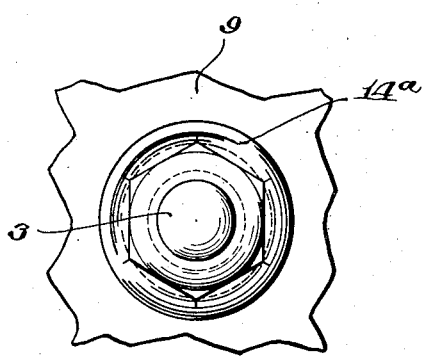
Fig. 2 is an end elevation of one of the studs with the nuts secured thereon.

Describing the various parts by reference characters, 1 denotes a wheel hub from which projects a radial flange 2 that carries a plurality of fastening studs 3. In the present instance each stud is shown threaded at each end and provided intermediate such thread portions with a collar 4 which seats within a recess 5 in the hub flange. One of the threaded ends projects through an aperture 6 in the hub flange and receives a nut 7 to secure the stud to the flange, while the opposite threaded end of the stud projects laterally and is adapted to receive the fastening nuts to retain the wheels in position.

While the fastening means disclosed herein may be used for fastening wheels other than those of the disc type, I have shown for purposes of illustration a dual disc type wheel consisting of a pair of similar discs 9, each provided with a circumferential series of apertures 10 of a diameter somewhat greater than the diameter of studs 3 so as to provide considerable clearance between the walls of the apertures and the studs. The edges of each of these apertures are beveled on both sides of each disc as indicated at 11 to define seats for a cooperating portion of the fastening nuts to be described hereinafter. The bevel 11 is formed on both sides of each disc to permit the discs to be used interchangeably, and may be of conical or spherical contour.

Threaded on each stud 3 are two nuts 12 and 13. Nut 12 is preferably of the standard type commonly used for detachably securing a single wheel to the hub flange and comprises a prismatic wrench receiving portion 14 and an enlarged annular portion 15 having a beveled surface 16 that is adapted to engage the bevel seat 11 of the inner wheel to draw the wheel into tight engagement with hub flange 2. Nut 13 is also formed with a prismatic wrench receiving portion 14$^a$ preferably of the same size as formed on nut 12 so that one wrench may serve for both nuts. An enlarged annular skirt portion 17 projects axially from the prismatic portion 14$^a$. This skirt portion is adapted to receive and enclose the prismatic portion 14 of nut 12, and in actual practice I preferably form the diameter of the bore defined by the skirt portion slightly larger than the greatest diameter of the prismatic portion 14 so that nut 13 may be rotated on stud 3 independently of nut 12. The peripheral edge portion of the skirt 17 is beveled as indicated at 18 to cooperate with beveled seat 11 of the outer disc.

In use, one of the wheels is positioned with its proper side toward the hub flange 2 and with the studs 3 projecting through the apertures 10. A nut 12 is then applied to each stud so that the beveled portion 16 thereof engages the beveled seat 11 of the wheel, and upon tightening these nuts the wheel will be centered with respect to the hub and will be securely attached to the hub flange. The other wheel is next positioned with its proper side toward the former wheel and with the studs 3 projecting through the apertures 11 therein. Nuts 13 are now threaded, one on each stud and tightened so that the beveled portion 18 thereof engages the beveled seat 11 of the outer wheel and forces the same into snug engagement with the inner wheel. The wheels are demounted in the reverse order to that described above.

With the construction described above it will be noted that when the inner nuts 12 clamp against the inner disc, each nut finds its seat by putting a very slight bend in its stud just beyond the collar 4. The outer nut 13 being telescoped over a portion of the inner nut finds its seat by very slightly bending both the inner nut and stud. The reason for this slight bending is that it is impossible in production to accurately drill or ream a number of holes in two separate elements which will align with complete accuracy. It will be understood, of course, that the aforementioned bending is of a very small degree, but is sufficient to insure a good seat between the nuts and respective discs and is highly desirable as it serves to retain the nuts in position by placing a tension between the nuts and discs which increases the friction therebetween.

It will also be noted that each nut is formed with a prismatic wrench receiving portion of the same size, hence one wrench will serve for both nuts and the same tension will be placed on both the inner and outer nuts.

Having thus described my invention, what I desire to claim by Letters Patent is:—

1. A dual wheel construction comprising a hub having a plurality of studs projecting laterally therefrom, a pair of wheels mounted on said hub and having apertures through which said studs project, a pair of nuts threaded directly on each stud, the outer nut having a skirt adapted to surround the other nut, the inner nut having a portion adapted to engage the inner wheel, and the skirt of the outer nut having a portion adapted to engage the outer wheel.

2. A disc wheel construction comprising a hub having a plurality of studs projecting laterally therefrom, a pair of disc wheels mounted on said hub and having enlarged apertures through which said studs freely project, the metal of said discs adjacent said apertures being formed to define seats, a pair of nuts threaded directly on each stud, each of said nuts having a prismatic wrench receiving portion and an annular portion formed with a surface to engage said seat, one of said nuts being adapted to engage one of said wheels and the other nut the other wheel and one of said nuts having a recess therein adapted to receive the prismatic portion of the other nut.

In testimony whereof he hereunto affixes his signature.

J. HAROLD HUNT.